US011929008B2

(12) United States Patent
Zhang

(10) Patent No.: US 11,929,008 B2
(45) Date of Patent: Mar. 12, 2024

(54) PROCESSING METHOD AND APPARATUS

(71) Applicant: Lenovo (Beijing) Limited, Beijing (CN)

(72) Inventor: Ya Zhang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/551,900

(22) Filed: Dec. 15, 2021

(65) Prior Publication Data

US 2022/0319390 A1    Oct. 6, 2022

(30) Foreign Application Priority Data

Mar. 31, 2021   (CN) .......................... 202110349894.5

(51) Int. Cl.
*G09G 3/20* (2006.01)
(52) U.S. Cl.
CPC ..... *G09G 3/2092* (2013.01); *G09G 2300/026* (2013.01); *G09G 2340/0464* (2013.01); *G09G 2354/00* (2013.01)
(58) Field of Classification Search
CPC .................. G09G 2340/0464; G09G 2354/00
See application file for complete search history.

(56) References Cited

U.S. PATENT DOCUMENTS

| 2005/0162337 | A1* | 7/2005 | Ohashi ................... H04N 21/47 348/E5.111 |
| 2016/0132174 | A1* | 5/2016 | Yoo ........................ G06F 3/0482 345/173 |
| 2016/0210769 | A1* | 7/2016 | Suryanarayana ......... G06T 3/40 |
| 2019/0042066 | A1* | 2/2019 | Kim ....................... H04M 1/725 |
| 2021/0232271 | A1* | 7/2021 | Morita ................ G06F 3/04883 |
| 2022/0108668 | A1* | 4/2022 | Fan ......................... G06F 3/147 |

FOREIGN PATENT DOCUMENTS

| CN | 1551621 A | 12/2004 |
| CN | 110721467 A | 1/2020 |

* cited by examiner

*Primary Examiner* — Samantha (Yuehan) Wang
(74) *Attorney, Agent, or Firm* — ANOVA LAW GROUP, PLLC

(57) ABSTRACT

A processing method includes displaying an indication region including a plurality of representation regions of a plurality of display sub-areas obtained by dividing a plurality of display devices of or connected to an electronic device; in response to an operation on a target object, determining, from the plurality of representation regions, a target representation region to be associated with the target object; and displaying the target object in the display sub-area corresponding to the target representation region.

19 Claims, 9 Drawing Sheets

PROCESSING METHOD AND APPARATUS

CROSS-REFERENCE TO RELATED APPLICATION

This application claims priority to Chinese Application No. 202110349894.5, filed on Mar. 31, 2021, the entire content of which is incorporated herein by reference.

FIELD OF THE DISCLOSURE

The present disclosure generally relates to the field of display technology and, more particularly, to a processing method and an apparatus.

BACKGROUND

A display area of a display of an electronic device is split by split-screen software, such that the display area is logically divided into a plurality of sub-areas. Windows of different applications are displayed in the plurality of sub-areas divided by the split-screen software, such that a user uses one electronic device to view contents of the windows of different applications at the same time.

However, when the electronic device is connected to or has multiple displays, how to realize the split-screen display of objects (e.g., the applications) is still a technical problem that needs to be solved.

SUMMARY

In accordance with the disclosure, there is provided a processing method including displaying an indication region including a plurality of representation regions of a plurality of display sub-areas obtained by dividing a plurality of display devices of or connected to an electronic device; in response to an operation on a target object, determining, from the plurality of representation regions, a target representation region to be associated with the target object; and displaying the target object in the display sub-area corresponding to the target representation region.

Also in accordance with the disclosure, there is provided an electronic device including a memory storing a program and a processor. The processor is configured to execute the program to display an indication region including a plurality of representation regions of a plurality of display sub-areas obtained by dividing a plurality of display devices of or connected to the electronic device; in response to an operation on a target object, determine, from the plurality of representation regions, a target representation region to be associated with the target object; and display the target object in the display sub-area corresponding to the target representation region.

BRIEF DESCRIPTION OF THE DRAWINGS

In order to provide a clearer illustration of various embodiments of the present disclosure, the drawings used in the description of the disclosed embodiments are briefly described below. It is apparent that the following drawings are merely example embodiments of the present disclosure. Other drawings may be obtained based on the disclosed drawings by those skilled in the art without creative efforts.

The terms "first," "second," "third," "fourth," and the like in the specification, claims, and the drawings are used to distinguish similar parts, but not intended to describe specific order or sequence. It should be understood that the objects described by the above terms can be interchanged under appropriate circumstances, such that the disclosed embodiments can be implemented in a sequence other than those described herein.

DETAILED DESCRIPTION OF THE EMBODIMENTS

The solution of the disclosure can be applicable to an electronic device having or being connected to a plurality of display devices. Using the solution of the disclosure, the electronic device can perform a split-screen display control of the object showing in the plurality of display devices, thereby realizing the split-screen display control of the plurality of display devices and improving a flexibility of the split-screen display.

In order to provide a clear illustration of the present disclosure, embodiments of the present disclosure are described with reference to the drawings. It is apparent that the described embodiments are merely some of embodiments of the present disclosure, but not all of embodiments of the present disclosure. Other embodiments obtained based on the disclosed embodiments by those skilled in the art without creative efforts are intended to be within the scope of the present disclosure.

Figure 1:
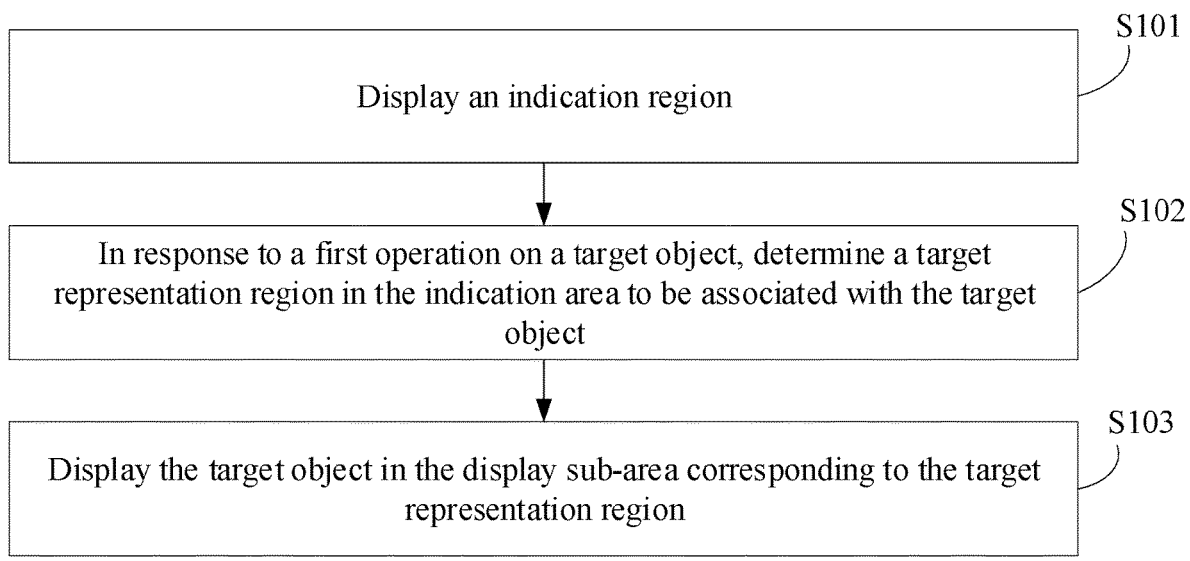
FIG. 1 is a schematic flowchart of a processing method according to an embodiment of the disclosure.

FIG. 1 is a schematic flowchart of a processing method consistent with the disclosure. The processing method can be applied to the electronic device, and the electronic device may have or be connected to the plurality of display screens.

For example, the electronic device may include a mobile phone, a tablet computer, or a computer device connected to a plurality of display screens. The electronic device may be an electronic device having two or more display screens, such as a tablet computer or a laptop having dual screens. The electronic device may be an electronic device having the plurality of display screens and at least one external display screen. The electronic device is not limited herein.

As shown in FIG. 1, at S101, an indication region is displayed. The indication region can include a plurality of representation regions of a plurality of display sub-areas obtained by dividing the plurality of display devices of or connected to the electronic device.

The plurality of display sub-areas can include a plurality of partitions obtained by dividing the plurality of display devices (or display areas of the plurality of display devices), and the plurality of display sub-areas obtained by dividing the plurality of display devices can include the plurality of display sub-areas obtained by dividing the display areas of the plurality of display devices. The representation regions of the plurality of display sub-areas can include the plurality of representation regions denoting the plurality of display sub-areas.

In some embodiments, the plurality of display sub-areas obtained by dividing the plurality of display devices (e.g., the display areas of the plurality of display devices) may include display partitions obtained by dividing the plurality of display devices as a whole, or, at least one display partition obtained by dividing each display device independently, or a combination of thereof.

For example, in some embodiments, the indication region can include a first indication region. The first indication region can include the representation regions of the plurality of display sub-areas obtained by dividing an overall display area formed by the plurality of display devices. Since the division is performed on the overall display area formed by the plurality of display devices, a display sub-area resulting from the division may include a part of one display device or an entire display device, or may include a part or a plurality of display devices or entire plurality of display devices.

Figure 2:
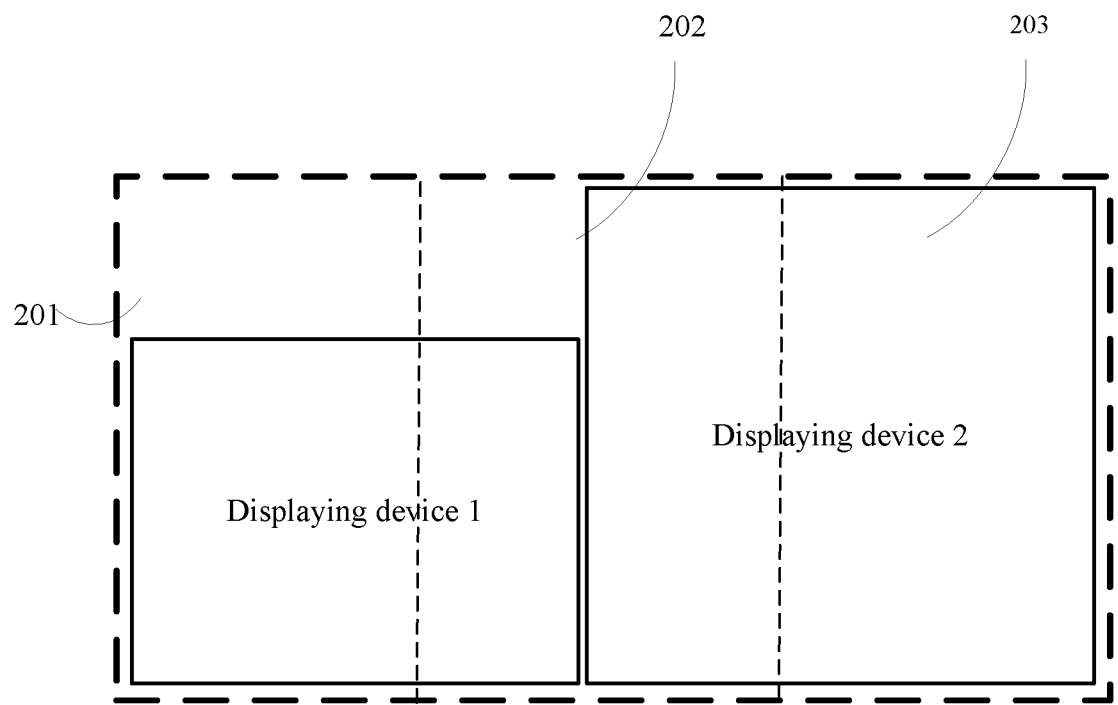
FIG. 2 is a schematic diagram showing an indication region according to an embodiment of the disclosure.

FIG. 2 is a schematic diagram showing the indication region consistent with the disclosure. Taking the plurality of display devices of the electronic device including a display device 1 and a display device 2 as an example, the indication region is shown in FIG. 2. As shown in FIG. 2, the indication region includes the schematic diagrams of the display device 1 and the display device 2. In FIG. 2, an overall display area formed by the two display devices (an area having the largest area enclosed by thick dotted lines in FIG. 2) is divided into three display sub-areas. In FIG. 2, the schematic diagrams of the two display devices are divided into three display sub-areas indicated by thin dashed lines.

To facilitate distinction, the three display sub-areas resulting from division are referred to as display sub-area A, display sub-area B, and display sub-area C. Correspondingly, the representation regions of the three display sub-areas obtained by dividing the two display devices can be obtained, and each representation region in FIG. 2 can include an area framed by the thin dashed line. As shown in FIG. 2, the representation region 201 of the display sub-area A, the representation region 202 of the display sub-area B and the representation region 203 of the display sub-area C are displayed.

It can be seen from the representation region 201 of the display sub-area A in FIG. 2 that the display sub-area A is formed by a portion of the display device 1.

It can be seen from the representation region 202 of the display sub-area B that the display sub-area B is formed by a remaining portion of the display device 1 and a portion of the display device 2.

Similarly, the display sub-area C is formed by the remaining portion of the display device 2 not belonging to the display sub-area B.

FIG. 2 is an example of the plurality of display devices as a whole being divided into the plurality of display sub-areas. As shown in FIG. 2, in the case where the plurality of display devices as a whole are divided into the plurality of display sub-areas, each display sub-area may include a portion of one display device, or portions of a plurality of display devices.

A display sub-area may further include the entirety of one display device and a portion of at least one display device. For example, the display sub-area may include a portion of the display device 1 and the entire display device 2.

In some embodiments, the indication region may include a second indication region. The second indication region can include the representation region of at least one display sub-area obtained by dividing each of the plurality of display devices. The display sub-areas can be obtained by regarding each display device as an object that needs to perform the screen split. Therefore, each display device can be divided into one or more display sub-areas, and each display sub-area can belong to only one display device.

Figure 3:
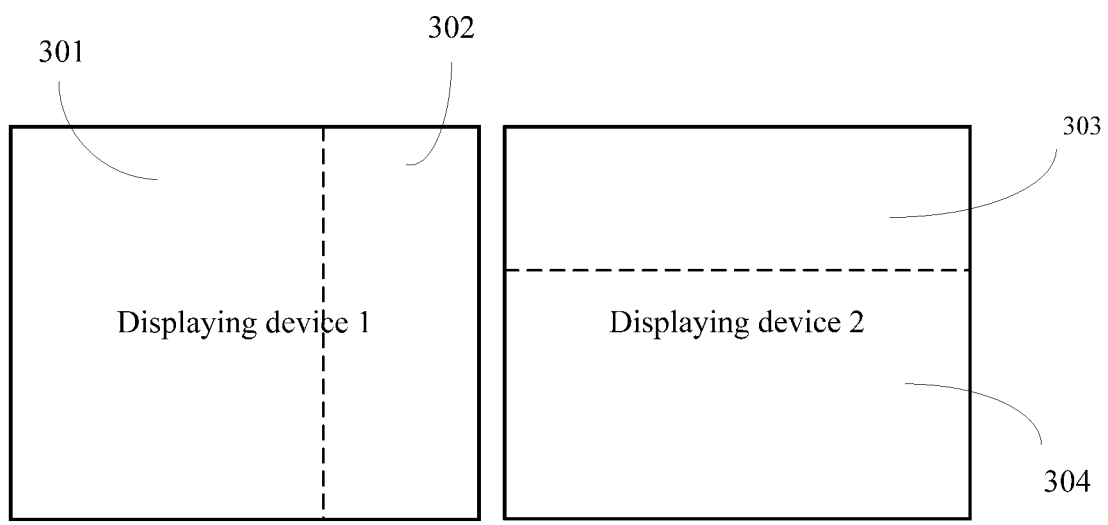
FIG. 3 is a schematic diagram showing another indication region according to an embodiment of the disclosure.

Taking an electronic device having the display device 1 and the display device 2 as an example, FIG. 3 is a schematic diagram of another indication region consistent with the disclosure.

As shown in FIG. 3, a schematic diagram of the display device 1 and a schematic diagram of the display device 2 are displayed in the indication region, and each display device is divided into one or more display sub-areas. In the example shown in FIG. 3, each display device is divided into two display sub-areas by a dotted line.

For example, the indication region in FIG. 3 is marked with a representation region 301 of a display sub-area A and a representation region 302 of a display sub-area B obtained by dividing the display device 1. The display device 2 can be divided into two display sub-areas. The indication region in FIG. 3 shows a representation region 303 of a display sub-area C and a representation region 304 of a display sub-area D obtained by dividing the display device 2.

In some embodiments, the indication region may include both the first indication region and the second indication region, thereby increasing the diversity of the display sub-areas for displaying the object.

In response to the indication region including both the first indication region and the second indication region, a size of a guiding representation region of a display device in the first indication region and a guiding representation region of the same display device in the second indication region may be different. In order to facilitate distinction, the representation region of the display device in the indication region can be referred to as the guiding representation region of the display device.

For example, the guiding representation regions of at least some of the plurality of display devices in the first indication region have a different size from the guiding representation regions in the second indication region, or each display device in the indication region has the same size of guiding representation regions in the first indication region and the second indication region.

Figure 4:
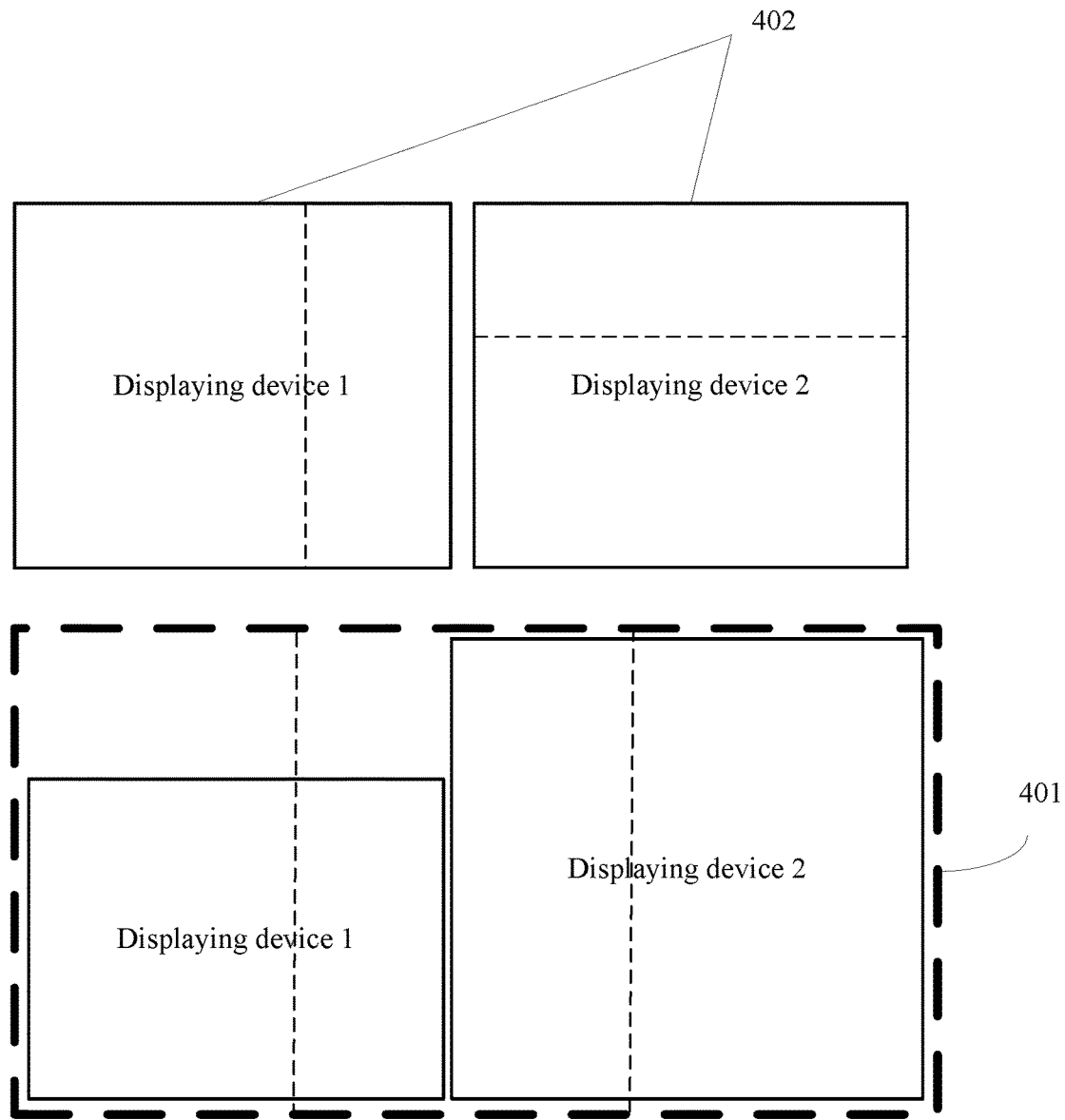
FIG. 4 is a schematic diagram showing another indication region according to an embodiment of the disclosure.

FIG. 4 is a schematic diagram of another indication region consistent with the disclosure, in which the indication region includes a first indication region and a second indication region.

As shown in FIG. 4, the indication region includes a first indication region 401 and a second indication region 402. The first indication region is the indication region shown in FIG. 2 and the second indication region is the indication region shown in FIG. 3. The guiding representation regions of the display devices in the first indication region and the second indication region are shown by solid line boxes where the display devices are located.

In some embodiments, when the first indication region is used to display the representation regions of the plurality of display sub-areas obtained by dividing the plurality display devices, the size of the display device in the first indication region can be proportional to resolution information (such as the number of pixels) of the display sub-area. It is possible to determine each of the plurality of display sub-areas obtained by dividing the plurality of display devices corresponds which part of the pixel area or coordinate area of which display device.

As shown in the first indication region in FIG. 4 (similar to FIG. 2), the number of pixels of the display device 1 is relatively small as compared to the display device 2, and the area of the display device 1 in the first indication region 401 can be smaller than the area of the display device 1.

Since the second indication region includes a representation region of at least one display sub-area obtained by dividing each of the plurality of display devices, the resolution ratio relationship between different display devices will not affect the determination of the display sub-areas. In order to facilitate a user operation, the area of each display device in the second indication region can be completely the same. Although the resolution of the display device 1 and that of the display device 2 in the second indication region in FIG. 4 are different, the displayed sub-areas are completely the same.

As shown in FIG. 4, the size of the guiding representation region of the display device 1 in the first indication region is different from the size of the guiding representation region of the display device 1 in the second indication region. However, the size of the guiding representation region of the display device 2 in the first indication region is same as the size of the guiding representation region of the display device 2 in the second indication region.

The second indication region can also display each display device according to the proportional relationship of the corresponding resolution of each display device, which is not limited herein.

In practical application scenarios, the indication region may have other options, which is not limited herein.

In order to distinguish the representation regions of the plurality of display devices, the display sub-areas, and a part or entirety of a combination area of the plurality of display devices in the indication region, the representation regions of the plurality of display devices, the display sub-areas, and the combination area of the plurality of display devices in the indication region can be indicated by different display effects, thereby prompting different area objects through different display effects. The display effect of the frame may include one or more of the effects of color, line shape, line thickness, and the like.

As shown in FIGS. 2 and 3, the plurality of display devices, the plurality of divided display sub-area, and the entire area formed by the plurality of display devices are distinguished by line shape and thickness. For example, as shown in FIG. 2, the thick lines are the frame of the entire area formed by the plurality of display sub-areas, the solid lines represent the plurality of display devices, and the thin dashed lines are lines dividing different display sub-areas, and the different sides of the thin dashed line represent different display sub-areas resulting from division.

The indication region can prompt the user of the multiple selectable display sub-areas that can be obtained by dividing the plurality of display devices of the electronic device, such that the user can select a display sub-area for displaying objects from the plurality of display sub-areas according to needs.

At S102, in response to a first operation on a target object, a target representation region in the indication region to be associated with the target object is determined.

The target object is an object that needs to be displayed in a display sub-area obtained by dividing the plurality of display devices. The target object may include a window of an application program, or an object with movable display location, such as an icon used to display the window after startup.

The first operation on the target object is an operation that triggers selection of the display sub-area for displaying the target object from the indication region. In response to the first operation, the representation region that needs to be associated with the target object needs to be determined in the indication region. Establishing an association with the target object refers to an association between the target object and the representation region established through the first operation.

In order to facilitate distinction, the representation region determined based on the first operation is referred to as the target representation region.

The specific form of the first operation can have many options, which is not limited herein. The following takes several possible situations as examples.

In some embodiments, the first operation may include the first operation of moving the target object to the indication region. Correspondingly, after detecting the first operation of moving the target object to the indication region, according to the target location where the target object moves to the indication region, the representation region where the target location is located can be determined as the target representation region to be associated with the target object.

The target location where the target object moves to the indication region is the location to which the target object finally moves in the indication region determined by the first operation.

For example, after the target object is moved to the representation region of a certain display sub-area in the indication region, the first operation can be released, the target location can be in the representation region of the display sub-area, and accordingly, the representation region of the display sub-area is used as the target representation region.

In some embodiments, the first operation can include releasing the selected target object. In response to the first operation, the selected representation region in the indication region may be determined, and the selected representation region may be determined as the target representation region to be associated with the target object.

For example, the first operation may include selecting the target object and moving the target object to a certain location, then releasing the selected target object, such that the first operation can indicate that the condition for determining the representation region to be associated with the target object from the indication region is currently satisfied. In response to the first operation, the selected target representation region may be determined according to the user's selection operation on the indication sub-area after the first operation.

In practical applications, if the target object has been selected before the first operation, for example, the display indication region is triggered through the operation on the target object, after the indication region is displayed, if an operation to release the target object is detected, the first operation is confirmed to be detected, such that the operations of triggering the display indication region and triggering the determination indication region can be a series of continuous operations.

It can be understood that the above description is based on several possible situations of the first operation as examples. In actual applications, the first operation may also have other options, which are not limited herein.

At S103, the target object is displayed in the display sub-area corresponding to the target representation region. For example, according to a mapping relationship between the plurality of display devices and the plurality of display sub-areas resulting from division, the location area of the display sub-area corresponding to the target representation region in the at least one display device can be determined, and the target object can be displayed in the location area in the at least one display device.

For example, with reference to the indication region shown in FIG. 2, it is assumed that the target representation region is the representation region 201 of the display sub-area A, because the display sub-area A includes a left portion the display device 1, it is needed to display the display object in a display sub-area formed by the left portion of the display device 1.

In some embodiments, in order to be able to present the target object more clearly and completely, the display sub-area corresponding to the target representation region can be determined as an imaging location area of the target object, such that the imaging location area of the target object can cover the entire display sub-area, thereby improving the display effect of the target object.

Consistent with the disclosure, the indication region can include the representation regions of a plurality of display sub-areas obtained by dividing a plurality of display devices of an electronic device. Through the indication region, information of the plurality of display sub-areas obtained by performing screen splitting on the plurality of display devices can be prompted to the user. If the user wishes to display the target object in a certain display sub-area of the plurality of display sub-areas, the first operation can be performed on the target object. In response to the first operation, the electronic device can determine the target representation region to be associated with the target object from the indication region, and control the target object to be displayed in the display sub-area corresponding to the target representation region, thereby realizing the split-screen display control of the object in the plurality of display devices.

It is understandable that the indication region can be triggered to display under a variety of different conditions.

For example, in some embodiments, after the user starts the split-screen application, the indication region can be displayed in each display device of the electronic device, and the display of the indication region can be maintained.

However, the display of the indication region can occupy a display space of the display device, which may affect the user's operation of other objects in the display device.

In some embodiments, in order to reduce the occupation of the display space, and promptly indicate to the user the display sub-area where the display object can be selected, the indication region can be displayed when a second operation on the target object is detected and the second operation satisfies the trigger condition.

It can be understood that the trigger condition of the second operation of the display indication region may also have many options which can be set according to needs.

For example, the second operation satisfying the trigger condition may include an operation of moving the location of the target object. For example, if it is detected that the target object is dragged with a mouse or a touch operating body, the indication region can be displayed.

If the target object moves due to a mistouch or other reasons, it is likely to cause misjudgment of the electronic device, thereby triggering the display of the indication region.

In some embodiments, in order to reduce the indication region being displayed due to misoperation, the trigger condition can further include movement parameters that need to be satisfied to move the target object.

For example, the second operation satisfying the trigger condition may include moving the location of the target object, and the movement parameter includes at least one of a movement distance satisfying a condition, a movement time satisfying a condition, or a movement trajectory satisfying a condition.

The condition that the movement distance satisfies may include the distance to move the location of the target object exceeds a set distance threshold, and the like, which can be specifically set as actual needs.

Similarly, the condition that the movement time satisfies may include a movement time length of the target object exceeds a set time length, and the like. The condition that the movement trajectory satisfies may include the movement trajectory is a continuous sliding trajectory of a single point or multiple points, or conforms to a set trajectory shape, and the like, which can be specifically set according to actual needs, and is not limited herein.

In some embodiments, when it is detected that the location of the target object is being moved, an action point of moving the target object is located in a designated area such as a title bar of the target object, and the movement parameters satisfy any of the above conditions, it can be confirmed that the second operation satisfying the trigger condition is detected.

A movement operation can be detected through a hook function installed in the electronic device for monitoring a mouse or a touch point, and the action point, the movement distance, and the movement parameters of the movement operation can be determined. Detecting the movement operation in other ways is also applicable to this disclosure, which is not limited herein.

In some embodiments, in order to improve a flexibility of displaying the indication region, the display of the indication region can be triggered through a specific voice or a button. For example, if a voice command is detected, the indication region can be displayed. For example, the voice command can include voice information requesting the display of the indication region, or a voice command for performing the display control on the target object, and the like.

As another example, when the setting button is detected to be pressed, the indication region can be displayed, or, if an input track satisfying the condition is detected, the indication region can be displayed, and the like, which is not limited herein.

The above description are merely several examples for triggering the display of the indication region. In practical applications, the display indication region can also be triggered in other ways. The solution of triggering the display indication region by other means is also applicable to this disclosure, which is not limited herein.

In order to facilitate the understanding of the solution of the present disclosure, the processing method of the present disclosure will be introduced below by taking the display of the indication region triggered by the detection of the second operation satisfying the trigger condition as an example.

Figure 5:
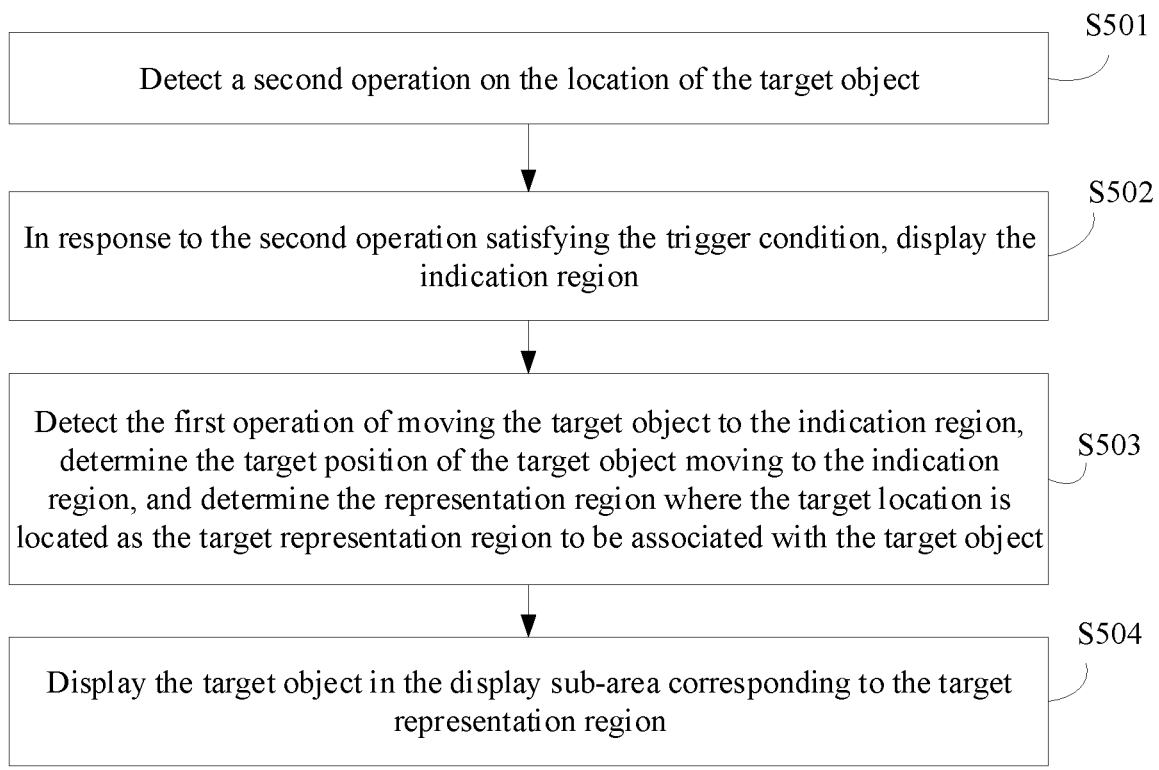
FIG. 5 is a schematic flowchart of another processing method according to an embodiment of the disclosure.

FIG. 5 is a schematic flowchart of another processing method consistent with the disclosure. The method may be applied to the electronic device, and the electronic device may have or be connected to the plurality of display screens.

At S501, a second operation on the location of the target object is detected.

In order to be distinguished from the first operation on the target object after the indication region is displayed, the operation on the target object before the indication region is displayed can be referred to as the second operation. The first operation and the second operation are merely for distinguishing operations of different operations, and have no other limiting effect.

At S502, in response to the second operation satisfying the trigger condition, the indication region is displayed.

The trigger condition is that the second operation is an operation to move the target object, and the movement parameters for moving the target object may include any one or more of the movement distance satisfying a condition, the movement time satisfying a condition, and the movement trajectory satisfying a condition.

For the conditions that the movement parameters satisfy, reference can be made to the description above, which will not be repeated herein.

The indication region can include the representation regions of the plurality of display sub-areas obtained by dividing the plurality of display devices of or connected to the electronic device.

The display location of the indication region can be set according to needs. For example, the display location can be displayed at any location or a specified location in a display device (such as any one of the plurality of display devices or a display device displaying a target object).

The purpose of displaying the indication region is to indicate the plurality of display sub-areas selected where the user can choose to display the target object, and the display sub-area for the target object can be determined based on the indication region. Therefore, in order to facilitate the operation of the user in the indication region, the display location of the display indication region can also be determined in connection with the location of the target object or an operation direction of the second operation, and the indication region can be displayed.

For example, in some embodiments, the location associated with the target object can be used as a display reference for displaying the indication region, and the indication region can be displayed in the set display sub-area of the display reference. The set display sub-area can be within a set coordinate range or a set pixel range of the display reference.

In some embodiments, a pre-operation location of the target object before the second operation is performed can be used as the display reference, and the indication region can be displayed in the set display sub-area of the display reference. For example, assuming that the target object is at the location a in the display device 1 before being moved by the second operation, the indication region may be displayed in the set display sub-area corresponding to the location a.

In some embodiment, in order to operate the indication region more conveniently after the target object is moved, it is also possible to use a post-operation location of the target object after the second operation satisfying the trigger condition is performed as the display reference, and display the indication region in the set display sub-area of the display reference.

For example, assuming that the second operation that satisfies the trigger condition is that the movement distance of the moving target object exceeds the set distance, then it is assumed that an initial location of the target object is location a. After detecting that the movement distance of the target object moved by the second operation exceeds the set distance, it is determined that the location of the target object after the second operation is location b, and then the location b can be used as the display reference, and the indication region can be displayed in the set display sub-area of the position b.

In some embodiments, according to the movement direction of the second operation, the indication region may be displayed within a target orientation range relative to the post-operation location of the target object. The post-operation location of the target object can be the location of the target object after the second operation that satisfies the trigger condition.

The target orientation range can include a direction range in which an included angle with the moving direction of the second operation is smaller than a set angle. The set angle range can be set as needed, for example, 15 degrees or the like.

According to the movement direction of the second operation, the target orientation range relative to the post-operation location of the target object after the second operation can be determined to belong to a range area that the second operation may move to along the moving direction. Therefore, displaying the indication region within the target orientation range may facilitate the user to directly operate the indication region after the second operation, thereby reducing the situation that the user readjusts the operation direction to operate the indication region after finishing the second operation, such that there is continuity between the second operation and the operation of the operation indication region, and the convenience of the operation of the indication region can be improved.

For example, the second operation can include dragging the target object to the right along the horizontal direction. Based on the relative horizontal movement to the right, the indication region can be displayed in a range area of the target object's location to the right along the horizontal direction or in an area with a set angle range from the horizontal and right direction. The direction of the indication region relative to the target object can be consistent with the direction of the second operation dragging the target object, such that the user can continue to operate the indication region after dragging the target object.

At S503, the first operation of moving the target object to the indication region is detected, the target position of the target object moving to the indication region is determined, and the representation region where the target location is located is determined as the target representation region to be associated with the target object.

For the processes at S503, reference may be made to the related description of the previous embodiment, and detailed description will be omitted herein.

In some embodiments, the first operation and the second operation may be two parts of a continuous operation. For example, the second operation can include setting a distance for moving the target object. The second operation can be maintained and the target object can be continued to be moved to the indication region, and the electronic device can confirm that the first operation is detected.

In some embodiments, in order to facilitate the user to determine the representation region where the target location is located, the electronic device can control each representation region to present a first effect, and when detecting that the target object moves into the representation region, the representation region can be controlled to present a second effect. that is, each indication region has an initial first effect, and when the target object moves to a certain representation region, the representation region where the target object is located can be switched from the first effect to the second effect.

The first effect can be different from the second effect. For example, the first effect and the second effect may have difference colors, for example, the first effect is red and the second effect is green. As another example, the first effect may present a static representation region and the second effect may present a dynamic representation region with a flicker effect.

After the target object moves to a certain representation region in the indication region, the effect presented by the representation region can change. Therefore, after seeing the representation region presenting the second effect, the user can confirm that the representation region is the representation region where the target object is located.

It should be noted that, the process at S503 is taken as an example for description, and determining the target representation region through other first operations is also applicable to this disclosure, which is not limited herein.

At S504, the target object is displayed in the display sub-area corresponding to the target representation region.

The representation region of each display sub-area of the indication region corresponds to the display sub-area obtained by dividing the plurality of display devices. That is, the mapping relationship between representation regions in the indication region and the pixel areas of the display sub-areas resulting from division in the plurality of display devices can be known. Therefore, after the target representation region is determined, the target representation region corresponding to the target display sub-area obtained by dividing the plurality of display devices and the actual pixel area of the target display sub-area can be determined. Thus, the target object can be displayed in the pixel area of the target display sub-area.

For example, since the indication region can display the representation regions of the plurality of display devices and the representation regions of the plurality of display sub-areas resulting from division, in order to facilitate distinction, the representation regions of the plurality of display devices can be referred to as the guiding representation regions of the plurality of display devices.

There is a proportional relationship between the guiding representation region of the display device in the indication region and the actual resolution of the display device. Therefore, the relative coordinate area of the guiding representation region of the display device in the indication region can have a mapping relationship with the actual pixel area of the display device, such that the pixel area contained in the display device can be located based on the relative coordinate area of the guiding representation region.

Similarly, the relative location coordinates of any representation region in the indication region actually have a mapping relationship with the pixel area of the display sub-area represented by the representation region in the plurality of display devices.

For example, referring again to FIG. 2, it can be seen from the representation region 202 of the display sub-area B in FIG. 2 that the display sub-area B is formed by the right portion of the guiding representation region of the display device 1 and the left portion of the guiding representation region of the display device 2.

When the relative coordinate area of the right portion of the guiding representation region of the display device 1 is determined, the actual pixel area p1 (size and location of the pixel area) of the display device 1 corresponding to the right portion of the guiding representation region of the display device 1 can be determined. Similarly, the actual pixel area p2 of the display device 2 corresponding to the left portion of the guiding representation region of the display device 2 can be determined. Thua, it can be determined that the representation region 202 of the display sub-area B is actually mapped to the actual pixel area p1 of the display device 1 and the actual pixel area p2 of the display device 2. Furthermore, if the target representation region is the representation region 202, the target object can be displayed in the sub-area formed by the actual pixel area p1 of the display device 1 and the actual pixel area p2 of the display device 2.

In order to facilitate the understanding of the solution of the present disclosure, the following description is combined with an application scenario.

Figure 6:
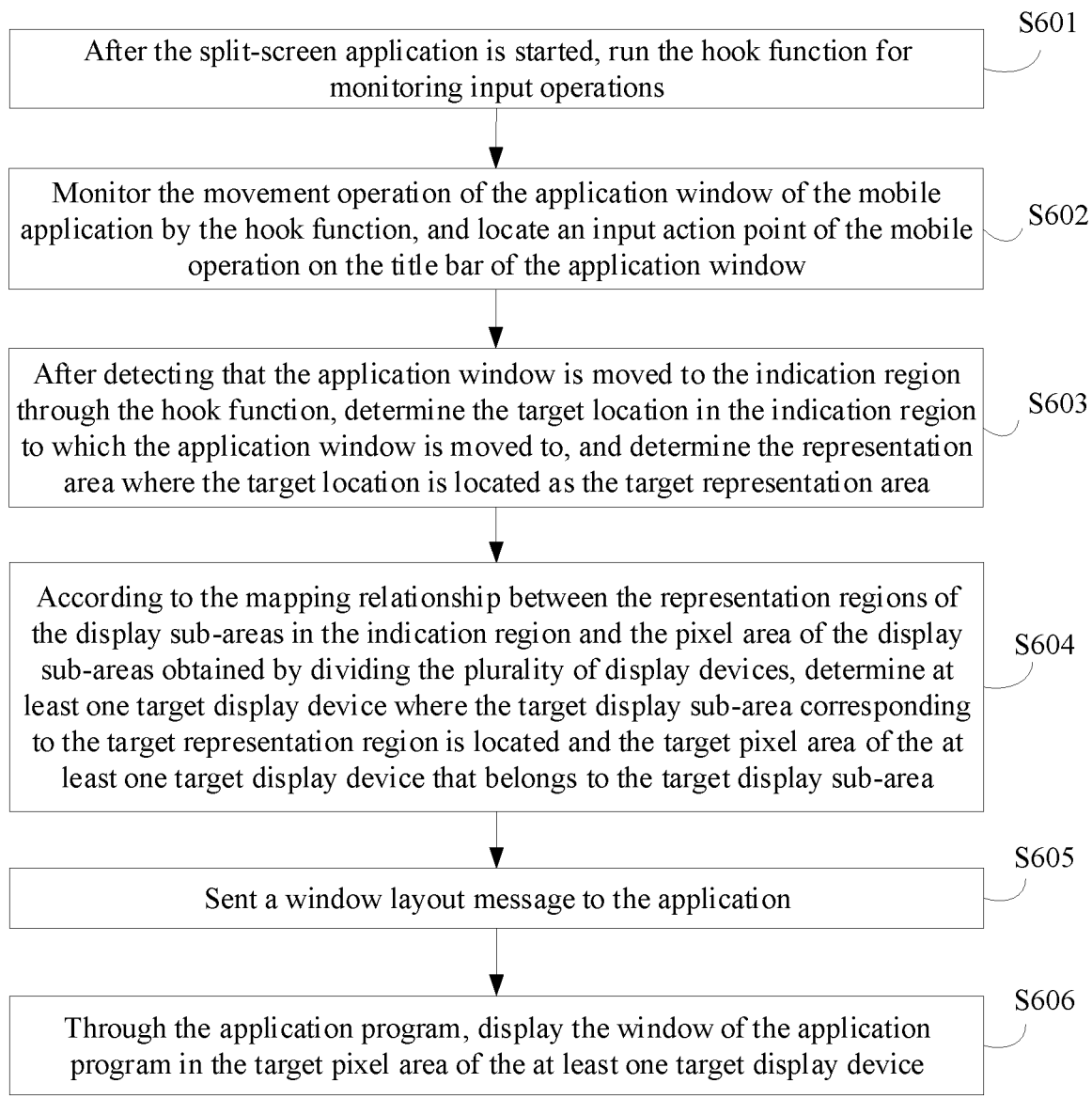
FIG. 6 is a schematic flowchart of a processing method applied in a scenario according to an embodiment of the disclosure.

Taking the target object being a window an application program as an example, a possible situation of the first operation and the second operation is described. FIG. 6 is a schematic flowchart of a processing method applied in a scenario consistent with the disclosure.

As shown in FIG. 6, at S601, after the split-screen application is started, the hook function for monitoring input operations is run.

For example, the hook function can include a mouse hook function that detects a mouse movement message, and/or a touch point monitoring hook function that monitors a touch point movement message, and the like, which is not limited herein.

At S602, the movement operation of the application window of the mobile application is monitored by the hook function, and an input action point of the mobile operation is located on the title bar of the application window. Based on the movement direction of the movement operation, the indication region is displayed within a target orientation range relative to the moved location of the application window.

Figure 7:
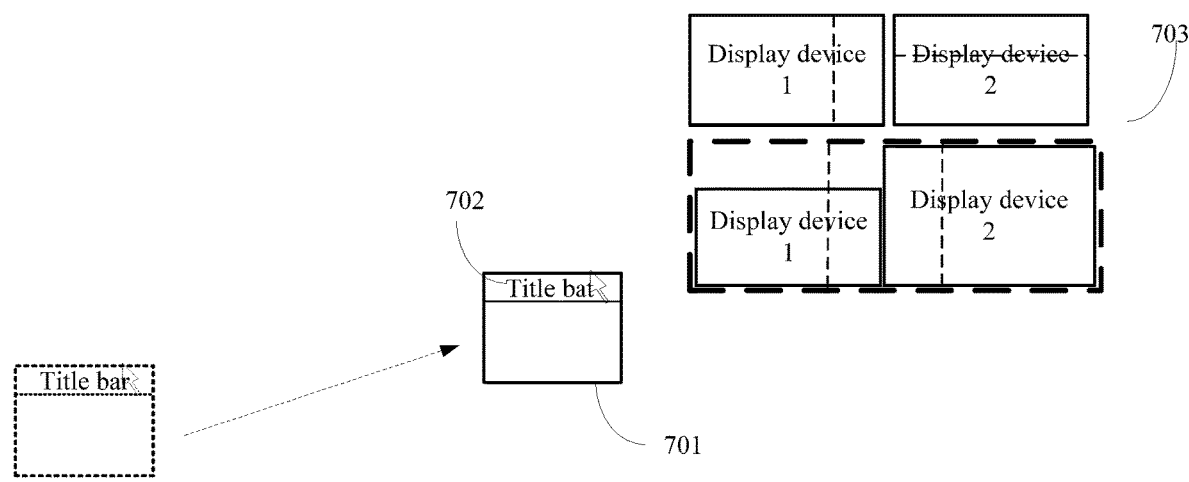
FIG. 7 is a schematic diagram showing triggering of an indication region by a mobile application window according to an embodiment of the disclosure.

FIG. 7 is a schematic diagram showing triggering of an indication region by a mobile application window consistent with the disclosure. As shown in FIG. 7, after the cursor is moved to the title bar 702 of the application window 701 and the application window 701 is dragged to move (dotted lines represent the state before the application window is moved), since the moving direction of the dragged application window is to move to the right, the indication region 703 can be displayed on the right side of the location where the application window is moved to.

At S603, after detecting that the application window is moved to the indication region through the hook function, the target location in the indication region to which the application window is moved is determined, and the representation area where the target location is located is determined as the target representation area.

For example, the hook function can monitor the coordinates of the destination location where the application window is moved to, and compare it with the coordinate area of each representation region in the indication region, and can determine the representation region where the coordinates of the destination location are located.

At S604, according to the mapping relationship between the representation regions of the display sub-areas in the indication region and the pixel areas of the display sub-areas obtained by dividing the plurality of display devices, at least one target display device where the target display sub-area corresponding to the target representation region is located and the target pixel area of the at least one target display device that belongs to the target display sub-area is determined.

In order to facilitate distinction, the display device to which the target display sub-area belongs can be referred to as the target display device. Referring again to FIG. 2, assuming that the target representation region is the representation region 202 of the display sub-area B, since the display sub-area B is formed by a portion of the display device 1 and a portion of the display device 2, the display device 1 and the display device 2 are target display devices.

The target pixel area of the target display device can be used to locate the portion of the target display device that belongs to the target display sub-area to which the target representation region is mapped. The target pixel area may include information such as the location and number of pixel points. For example, the target pixel area may be 100 pixels in the horizontal direction from the first pixel on the leftmost side of the target display device to the right side and a pixel area including 200 vertical pixels from the first pixel on the top of the target display device downward.

At S605, a window layout message is sent to the application.

The window layout message can carry information about the target pixel area of the at least one target display device.

At S606, through the application program, the window of the application program is displayed in the target pixel area of the at least one target display device.

For example, the application program can adjust the location and size of its application window according to the information of the target pixel area of the at least one target display device to present the application window in the target pixel area.

Consistent with the disclosure, the indication region can be generated in advance and stored in the electronic device. In some embodiments, the indication region can be generated in connection with the display parameters of the plurality of display devices of the electronic device, such as the resolution information or area sizes of the display devices, and the manner of dividing the plurality of display devices into the display sub-areas.

Figure 8:
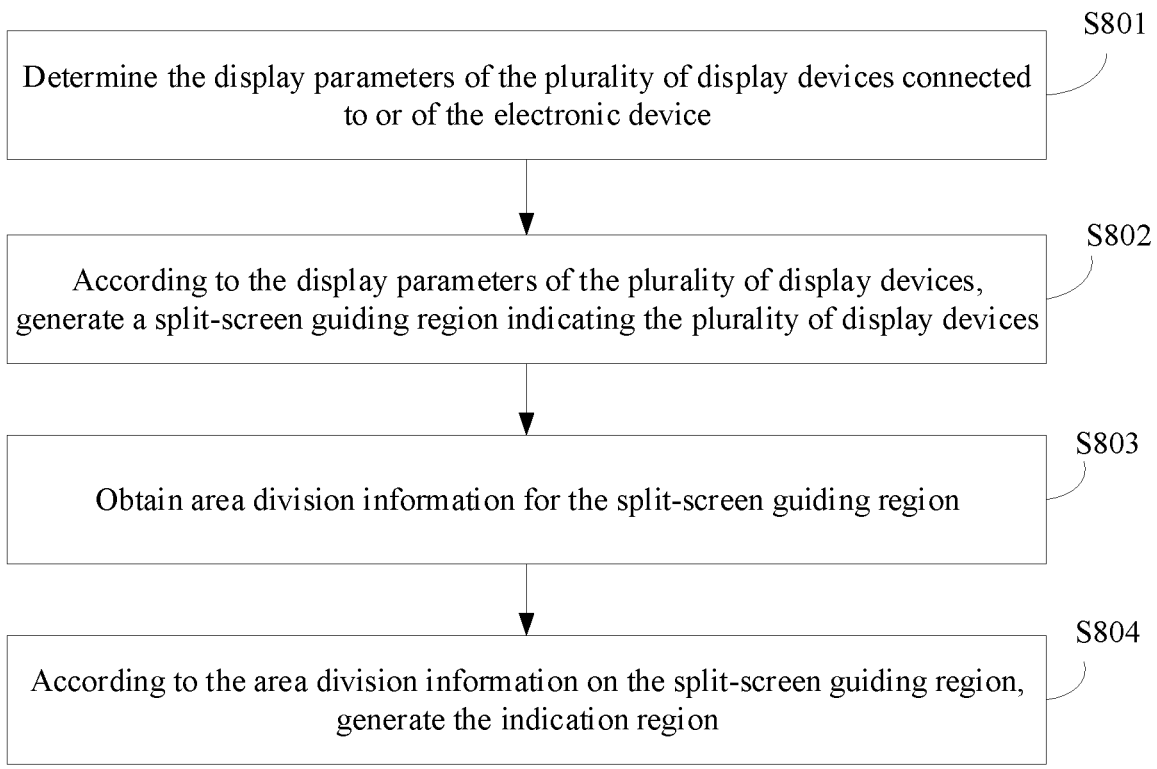
FIG. 8 is a schematic flowchart showing generating an indication region according to an embodiment of the disclosure.

Taking the plurality of display sub-areas obtained by dividing the plurality of display devices by interacting with the user as an example, the followings illustrate the process of generating the indication region. FIG. 8 is a schematic flowchart showing generating the indication region consistent with the disclosure.

At S801, the display parameters of the plurality of display devices connected to or of the electronic device are determined.

For example, the display parameters of the display device may include resolution information of the display device, where the resolution information includes the number of horizontal pixels and the number of vertical pixels of the display device.

As another example, the display parameters of the display device may include a vertical and horizontal size of the display device, the vertical and horizontal size includes a vertical size and a horizontal size.

The display parameters of the display device may also include resolution information, as well as horizontal and vertical dimensions, and may also include other information, which is not limited herein.

At 802, according to the display parameters of the plurality of display devices, a split-screen guiding region indicating the plurality of display devices is generated.

The split-screen guiding region can be configured to guide the user to divide the plurality of display devices into the plurality of display sub-areas.

The split-screen guiding region may include the guiding representation regions of a plurality of display devices, and the size and characteristics of the guiding representation regions of the plurality of display devices can be related to the display parameters of the plurality of display devices.

For example, in some embodiments, when the display parameter is pixel point information, according to the number of horizontal pixels and the number of vertical pixels of each of the plurality of display devices and the mapping relationship between the pixel points and the guiding region, the split-screen guiding region including the representation regions of the plurality of display devices can be constructed.

For example, a mapping relationship between the pixel points and the guiding region can represent the proportional relationship between the number of pixels and the size of the guiding region. Therefore, under the premise that the horizontal and vertical pixels of the display device are known, the horizontal and vertical lengths of the display device mapped into the split-screen guiding region can be determined, thereby determining the area size of the guiding representation regions corresponding to the plurality of display devices.

In some embodiments, when the display parameter is the horizontal and vertical dimensions of the display device, the horizontal and vertical dimensions of the guiding representation region of the display device in the split-screen guiding region can be determined according to the compression ratio of the horizontal and vertical dimensions and the horizontal and vertical dimensions of the display device.

There are other ways for determining the horizontal and vertical sizes of the guiding representation region of the display device, which is not limited herein.

In some embodiments, since the display parameters of the plurality of display devices of the electronic device are different, the area sizes of the guiding representation regions of the plurality of display devices can be different. Therefore, when the plurality of display devices are needed to perform an overall screen splitting, in order to more conveniently determine the area division of the guiding representation regions of the plurality of display devices in the split-screen guiding region, the split-screen guiding region may include a largest rectangle including the guiding representation regions of the plurality of display devices. The largest rectangle may be a rectangle with the smallest area that can include the guiding representation regions of the plurality of display devices, that is, the rectangle having the smallest area among all rectangles that can encompass the guiding representation regions of the plurality of display devices.

As shown in FIG. 2, the thick dashed lines containing the display device 1 and the display device 2 are the constructed largest rectangle, and the solid line box where a display device is located is the guiding representation region of the display device in the split-screen guiding region.

In some embodiments, as shown in FIG. 3, if it is needed to divide the display sub-area of each display device separately, the split-screen guiding region may only include guiding representation regions of the two display devices.

FIGS. 2 and 3 are schematic diagrams showing dividing the display sub-areas. At S802, merely the split-screen guiding region including the guiding representation regions of the plurality of display devices of the electronic device is constructed, but there is no representation region of each display sub-area divided by the dotted lines.

In order to provide more ways of dividing the display sub-areas from the plurality of display devices, the constructed split-screen guiding region may include the split-screen guiding region in the followings.

Figure 9:
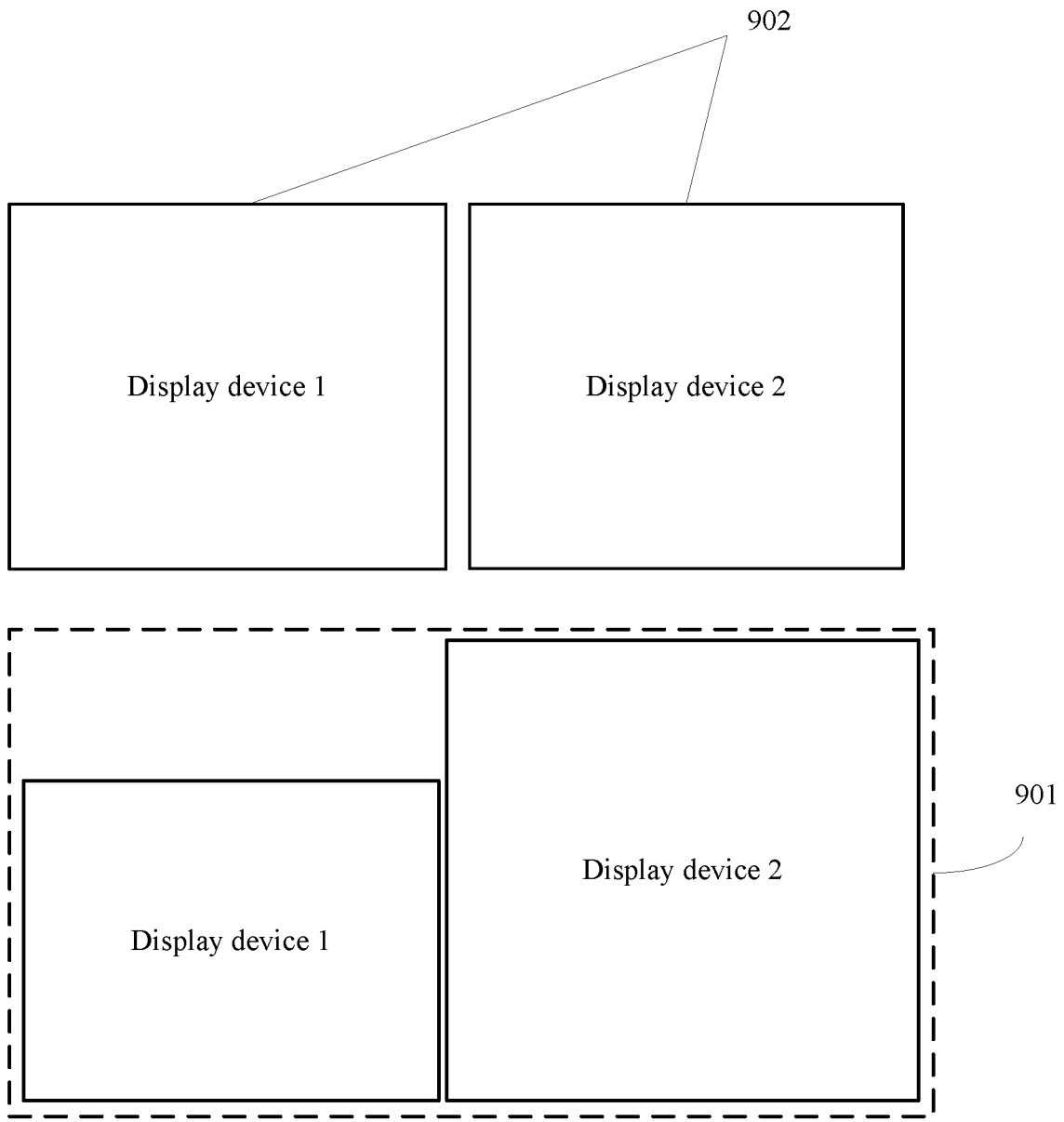
FIG. 9 is a schematic diagram showing generating a split-screen guiding region according to an embodiment of the disclosure.

FIG. 9 is a schematic diagram showing generating the split-screen guiding region consistent with the disclosure. As shown in FIG. 9, the split-screen guiding region includes two parts, one is the overall split-screen guiding region 901 indicated by the thick dashed rectangular frame used for dividing the plurality of display devices as a whole, and another is the independent split-screen guiding region 902 used for dividing the plurality of display devices individually to obtain the display sub-areas.

In some embodiments, after the split-screen guiding region is constructed, the split-screen guiding region can also be displayed on the display interface, and the split-screen guiding region shows the guiding region and the relative location relationship of the plurality of display devices. If a target operation for the guiding representation region of the display device is detected and satisfies the conditions, the location of the guiding representation region of the display device in the split-screen guidance area can be moved, thereby realizing the adjustment of the relative locational relationship of the guiding representation region of each display device in the divided-screen guiding region.

The target operation may include an operation of dragging the guiding representation region. The user can adjust the relative locational relationship of the guiding representation region of each display device in the split-screen guiding region by dragging each guiding representation region.

After the split-screen guiding region is generated, the relative coordinate area of the guiding representation region of each display device in the split-screen guiding region can be fixed. Therefore, the mapping relationship between the relative coordinate area of the guiding representation region of each display device and the actual pixel area of the display device can be determined, and the mapping relationship can be stored.

At S803, area division information for the split-screen guiding region is obtained.

The area division information can be used to indicate the plurality of display sub-areas obtained by dividing the plurality of display devices.

For example, the area division information can include division information for dividing each guiding representation region in the split-screen guiding region. Based on the area division information, the representation regions of the plurality of display sub-areas obtained by dividing the plurality of guiding representation regions in the split-screen guiding region can be determined.

After the representation regions of the plurality of display sub-areas to be obtained by dividing the split-screen guiding region are determined, the relative coordinate area of the representation region of each display sub-area relative to the split-screen guiding region can be determined. The relative coordinate area corresponding to the representation region of each display sub-area can be stored by the split-screen software.

For each display sub-area, combining the relative coordinate area corresponding to the representation region of the display sub-area and the relative coordinate area of the guiding representation region of each display device, at least one display device belonging to the representation region of the display sub-area and the target coordinate area of the representation region belonging to the display sub-area in the respective guiding representation region of the at least one display device in the split-screen guiding region can be determined.

For each of the at least one display device, according to the mapping relationship between the relative coordinate area of the guiding representation region of the display device and the actual pixel area of the display device, as well as the target coordinate area of the representation region belonging to the display sub-area in the guiding representation region of the display device, the actual pixel area belonging to the display sub-area in the display device can be determined, and finally the respective actual pixel area in the at least one display device to which the relative coordinate area of the display sub-area is mapped can be obtained.

In order to facilitate distinction, the previously determined mapping relationship between the relative coordinate area of the guiding representation region of the display device and the actual pixel area of the display device can be referred to as a first mapping relationship. The mapping relationship between the relative coordinate area of the display sub-area and the respective actual pixel area in the at least one display device can be referred to as a second mapping relationship. The split-screen software can store the first mapping relationship and the second mapping relationship.

There are also many other ways for obtaining the area division information, which is not limited herein.

For example, in some embodiments, the electronic device may have a plurality of area division templates, and the plurality of area division templates may include multiple possible area division methods corresponding to the split-screen guiding region. For example, the area division template may include dividing the split-screen guiding region into three areas (or two, or other numbers), the horizontal proportions of the three areas, and the like. As another example, each area division template may include the number of areas that may be obtained by dividing the guiding representation region of each display device in the split-screen guiding region, and the horizontal or vertical proportion of each sub-area.

The user can select the area division template based on which the display sub-areas is divided according to needs. Correspondingly, after the electronic device obtains the target area division template selected by the user from the plurality of area division templates, according to the area division rule indicated in the target area division template, the area division information of the divided screen guiding region can be determined.

Taking the overall split-screen guiding region 901 in FIG. 9 as an example, assume that the region division template selected by the user is to divide the overall split-screen guiding region into three sub-areas, and the proportional relationship of the three sub-areas is given in the template. After the region division template is applied to the overall divided-screen guiding region, the overall divided-screen guiding region can be divided into three sub-areas, and the effect of dividing the overall divided-screen guiding region into three sub-areas is shown in FIG. 2.

With reference to the overall split-screen guiding region 901 in FIG. 9 and FIG. 2, it can be seen that after each sub-area obtained by dividing the split-screen guiding region is known, the portion of the guiding representation region of each display device included in the overall split-screen guiding region 902 can be determined. Then, for each guiding representation region, according to the pixel mapping relationship between the guiding representation region and the display device, and the like, the pixel area belonging to the display sub-area corresponding to the guiding representation region in the display device can be determined.

In some embodiments, after the split-screen guiding region is displayed, the user can directly operate in the split-screen guiding region to divide the split-screen guiding region or the guiding representation region of the display device on the split-screen guiding region. Correspondingly, the electronic device can obtain a third operation on the split-screen guiding region, and determine the area division information of the split-screen guiding region according to the third operation.

For example, the third operation may include a touch operation or a mouse movement operation that satisfies the set trajectory on the split-screen guiding region.

At S804, according to the area division information on the split-screen guiding region, the indication region is generated.

After the area division information of the split-screen guiding region is determined, the area division of the split-screen guiding region results in the representation regions of the plurality of display sub-areas obtained by dividing the plurality of display devices, thereby generating the indication region.

After generating the indication region, the split-screen software can store the indication region and the first mapping relationship and the second mapping relationship previously determined.

FIG. 8 is merely an example of generating the indication region through the interaction between the electronic device and the user. In practical applications, other interaction methods may be used to generate the indication region according to the needs, which is not limited herein.

In practical applications, the indication region can further be divided into the display sub-areas of the plurality of display devices by the electronic device as needed, and the indication region can be constructed.

Figure 10:
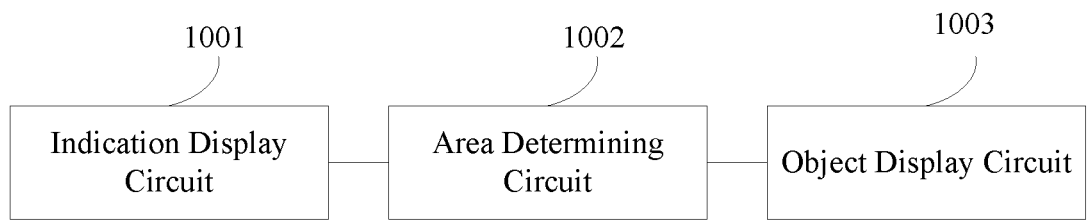
FIG. 10 is a schematic structural diagram of a processing apparatus according to an embodiment of the disclosure.

FIG. 10 is a schematic structural diagram of a processing apparatus consistent with the disclosure. The processing apparatus can be used in an electronic device.

As shown in FIG. 10, the apparatus includes an indication display circuit 1001 configured to display the indication region, the indication region including the representation regions of the plurality of display sub-areas obtained by dividing the plurality of display devices of or connected to the electronic device, an area determining circuit 1002 configured to determine the target representation region to be associated with the target object in the indication region in response to the first operation performed on the target object, and an object display circuit 1003 configured to display the target object in the display sub-area corresponding to the target representation region.

In some embodiments, the indication region displayed by the indication display circuit 1001 can include the first indication region and/or the second indication region. The first indication region can include the representation regions of the plurality of display sub-areas obtained by dividing the overall display area formed by the plurality of display devices. The second indication region can include the representation regions of at least one display sub-area obtained by dividing each of the plurality of display devices.

In some embodiments, the indication display circuit 1002 can include an operation detection circuit configured to detect the second operation on the target object and a display trigger circuit configured, in response to the second operation detected by the operation detection unit satisfies the trigger condition, to display the indication region.

The trigger conditions can include the second operation is the operation to move the location of the target object; and the movement parameters for moving the target object includes at least one of the movement distance satisfying the condition, the movement time satisfying the condition, or the movement trajectory satisfying the condition.

In some embodiments, when the indication display circuit or the display trigger circuit is displaying the indication region, the pre-operation location of the target object before the second operation or the post-operation location after the second operation satisfying the trigger condition can be used as the display reference, and display the indication region in the set display area of the display reference, or according to the movement direction of the second operation, the indication region within the target orientation range relative to the post-operation location of the target object can be displayed. The target orientation range can include the direction range in which the included angle with the moving direction is less than the set angle, and the post-operation location is the location of the target object after the second operation that satisfies the trigger condition.

In some embodiments, the area determining circuit 1002 can include area determining sub-units configured to detect the first operation of moving the target object to the indication region, determine that the target object moves to the target location in the indication region, and determine the representation region of the target location is located as the target representation region to be associated with the target object.

In some embodiments, the representation region in the indication region can present the first effect, and when the target object moves to the representation region, the representation region can present the second effect. The second effect is different from the first effect.

In some embodiments, the apparatus can further include a parameter determination circuit configured to determine the display parameters of the plurality of display devices connected to or of the electronic device before the indication region is displayed on the indication display circuit 1001, a guiding region generating circuit configured to generate the split-screen guiding region indicating the plurality of display devices based on the display parameters of the plurality of display devices, an information obtaining circuit configured to obtain area division information for the split-screen guiding region, where the area division information is used to indicate the plurality of display sub-areas obtained by dividing the plurality of display devices, and an indication region generating circuit configured to generate the indication region based on the area division information on the split-screen guiding region.

In some embodiments, the display parameters determined by the parameter determination circuit can include resolution information of the display device. The resolution information can include the number of horizontal pixels and the number of vertical pixels of the display device.

The guiding region generating circuit can be configured, according to the respective number of horizontal pixels and vertical pixels of the plurality of display devices and the mapping relationship between the pixels and the guiding region, to construct the split-screen guiding region including the guiding representation region of the plurality of display devices.

In some embodiments, the information obtaining circuit can include a first information obtaining circuit configured to display the plurality of area division templates, and obtain the target area division template selected by the user from the plurality of area division templates, and determine the area division information of the split-screen guiding region according to the area division rule indicated in the target area division template, or a second information obtaining circuit configured to obtain the third operation on the split-screen guiding region, and determine the area division information of the split-screen guiding region based on the third operation.

Figure 11:
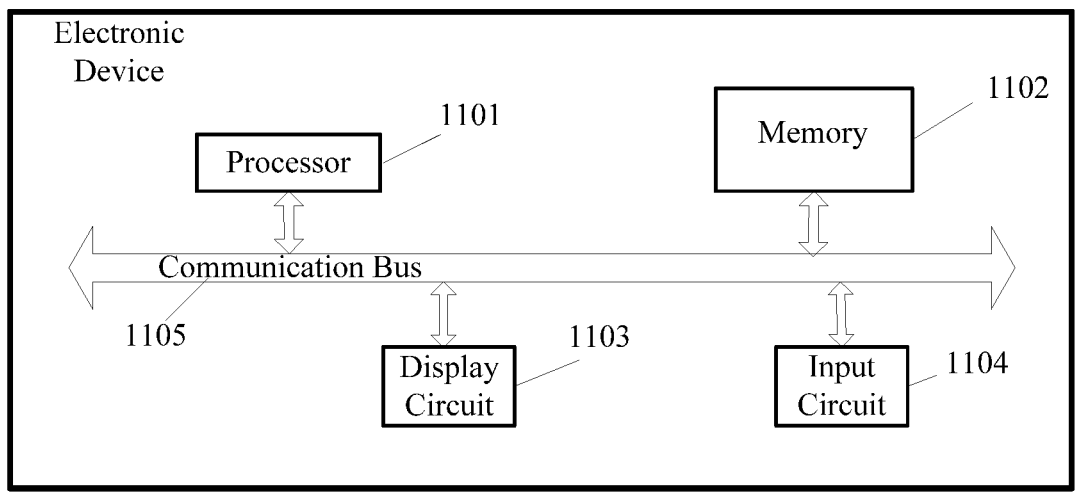
FIG. 11 is a schematic structural diagram of an electronic device according to an embodiment of the disclosure.

The present disclosure further provides an electronic device. FIG. 11 is a schematic structural diagram of the electronic device consistent with the disclosure. The electronic device may be connected to or have the plurality of display devices. As shown in FIG. 11, the electronic device includes at least a memory 1101 and a processor 1102.

The processor 1102 can be configured to execute the processing method in any of the above embodiments.

The memory 1101 can be configured to store programs needed by the processor to perform operations.

In some embodiments, as shown in FIG. 11, the electronic device further includes a display circuit 1103, an input circuit 1104, and a communication bus 1105. The electronic device may include more or less components than those shown in FIG. 8, which is not limited herein.

The present disclosure further provides a computer readable storage medium. The computer-readable storage medium can store at least one instruction, at least one program, code set, or instruction set. The at least one instruction, the at least one program, the code set or the instruction set can be loaded and executed by the processor to implement the processing method described in any one of the above embodiments.

In the present specification, the embodiments are described in a gradual and progressive manner with the emphasis of each embodiment on an aspect different from other embodiments. For the same or similar parts among the various embodiments, reference can be made to each other. Since the disclosed apparatus embodiments correspond to the disclosed method embodiments, detailed description of the disclosed apparatus is omitted, and reference can be made to the description of the methods for a description of the relevant parts of the apparatus.

The foregoing description of the disclosed embodiments will enable a person skilled in the art to realize or use the present disclosure. Various modifications to the embodiments will be apparent to those skilled in the art. The general principles described herein may be implemented in other embodiments without departing from the spirit or scope of the disclosure. Accordingly, the disclosure will not be limited to the embodiments shown herein, but is to meet the broadest scope consistent with the principles and novel features disclosed herein.

What is claimed is:

1. A processing method comprising:
displaying an indication region, the indication region including a plurality of representation regions of a plurality of display sub-areas obtained by:
combining display areas of a plurality of display devices to a whole display area, wherein the plurality of display devices are physical display screens coupled to an electronic device; and
dividing the whole display area into the plurality of display sub-areas, to obtain the plurality of representation regions, each display sub-area including a portion of one of the display devices or portions of multiple of the display devices;
in response to an operation on a target object, determining, from the plurality of representation regions, a target representation region to be associated with the target object wherein the target representation region includes a portion of a display area of a first display device of the plurality of display devices and at least a portion of a display area of a second display device of the plurality of display devices; and
displaying the target object in the display sub-area corresponding to the target representation region, wherein the display sub-area displaying the target object occupies both the portion of display area of the first display device and the at least one portion of the display area of the second display device.

2. The method according to claim 1, wherein the indication region includes at least one of:
a first indication region including the plurality of representation regions of the plurality of display sub-areas obtained by dividing the plurality of display devices as a whole; or
a second indication region including the representation region of at least one display sub-area obtained by dividing each of the plurality of display devices individually.

3. The method according to claim 1, wherein:
the operation is a first operation; and
displaying the indication region includes:
detecting a second operation on the target object; and
in response to the second operation satisfying a trigger condition, displaying the indication region, the trigger condition including:
a location of the target object being moved, and
movement parameters corresponding to movement of the target object satisfying at least one of:
a movement distance satisfying a first condition,
a movement time satisfying a second condition, or
a movement trajectory satisfying a third condition.

4. The method according to claim 3, wherein displaying the indication region includes:
displaying the indication region in a set display sub-area of a display reference that is a pre-operation location of the target object before the second operation is performed or a post-operation location of the target object after the second operation that satisfies the trigger condition.

5. The method according to claim 3, wherein displaying the indication region includes:
according to a movement direction of the second operation, displaying the indication region within a target orientation range relative to a post-operation location of the target object after the second operation is performed, the target orientation range including a direction range having an included angle with the moving direction of the second operation smaller than a set angle.

6. The method according to claim 1, wherein:
in response to the operation on the target object, determining the target representation region includes:
detecting the operation of moving the target object to the indication region;
determining that the target object moves to a target location in the indication region; and
determining the representation region where the target location is located as the target representation region;
the target representation region presents a first effect; and
in response to the target object moving to the target representation region, the target representation region presents a second effect different from the first effect.

7. The method according to claim 1, further comprising, before displaying the indication region:

determining display parameters of the plurality of display devices;

generating a split-screen guiding region indicating the plurality of display devices based on the display parameters of the plurality of display devices;

obtaining area division information for the split-screen guiding region, the area division information being used to indicate the plurality of display sub-areas obtained by dividing the plurality of display devices; and generating the indication region based on the area division information on the split-screen guiding region.

8. The method according to claim 7, wherein:
the display parameters include resolution information including a number of horizontal pixels and a number of vertical pixels of each display device; and
generating the split-screen guiding region includes constructing the split-screen guiding region including the guiding representation regions according to respective numbers of horizontal pixels and vertical pixels of the plurality of display devices and a mapping relationship between the pixels and the guiding regions.

9. The method according to claim 7, wherein obtaining the area division information includes:
displaying a plurality of area division templates;
obtaining a target area division template selected by a user from the plurality of area division templates; and
determining the area division information according to an area division rule indicated in the target area division template.

10. The method according to claim 7, wherein obtaining the area division information includes:
obtaining an operation on the split-screen guiding region; and
determining the area division information based on the operation on the split-screen guiding region.

11. The method according to claim 1, wherein:
one of the display sub-areas include portions of multiple of the display devices.

12. An electronic device comprising:
a memory storing a program; and
a processor configured to execute the program to:
display an indication region, the indication region including a plurality of representation regions of a plurality of display sub-areas obtained by:
combining display areas of a plurality of display devices to a whole display area, wherein the plurality of display devices are physical display screens coupled to the electronic device; and
dividing the whole display area into the plurality of display sub-areas, to obtain the plurality of representation regions, each display sub-area including a portion of one of the display devices or portions of multiple of the display devices;
in response to an operation on a target object, determine, from the plurality of representation regions, a target representation region to be associated with the target object, wherein the target presentation region includes a portion of a display area of a first display device of the plurality of display devices and at least a portion of a display area of a second display device of the plurality of display devices; and
display the target object in the display sub-area corresponding to the target representation region, wherein the display sub-area displaying the target object occupies both the portion of display area of the first display device and the at least one portion of the display area of the second display device.

13. The electronic device according to claim 12, wherein the indication region includes at least one of:
a first indication region including the plurality of representation regions of the plurality of display sub-areas obtained by dividing the plurality of display devices as a whole; or
a second indication region including the representation region of at least one display sub-area obtained by dividing each of the plurality of display devices individually.

14. The electronic device according to claim 12, wherein:
the operation is a first operation; and
the processor is further configured to execute the program to:
detect a second operation on the target object; and
in response to the second operation satisfying a trigger condition, display the indication region, the trigger condition including:
a location of the target object being moved, and
movement parameters corresponding to movement of the target object satisfying at least one of:
a movement distance satisfying a first condition,
a movement time satisfying a second condition, or
a movement trajectory satisfying a third condition.

15. The electronic device according to claim 14, wherein the processor is further configured to execute the program to:
display the indication region in a set display sub-area of a display reference that is a pre-operation location of the target object before the second operation is performed or a post-operation location of the target object after the second operation that satisfies the trigger condition.

16. The electronic device according to claim 14, wherein the processor is further configured to execute the program to:
according to a movement direction of the second operation, display the indication region within a target orientation range relative to a post-operation location of the target object after the second operation is performed, the target orientation range including a direction range having an included angle with the moving direction of the second operation smaller than a set angle.

17. The electronic device according to claim 12, wherein:
the processor is further configured to execute the program to:
detecting the operation of moving the target object to the indication region;
determining that the target object moves to a target location in the indication region; and
determining the representation region where the target location is located as the target representation region;
the target representation region presents a first effect; and
in response to the target object moving to the target representation region, the target representation region presents a second effect different from the first effect.

18. The electronic device according to claim 12, wherein the processor is further configured to execute the program to, before displaying the indication region:
determine display parameters of the plurality of display devices;
generate a split-screen guiding region indicating the plurality of display devices based on the display parameters of the plurality of display devices;

obtain area division information for the split-screen guiding region, the area division information being used to indicate the plurality of display sub-areas obtained by dividing the plurality of display devices; and generate the indication region based on the area division information on the split-screen guiding region.

19. The electronic device according to claim 18, wherein:

the display parameters include resolution information including a number of horizontal pixels and a number of vertical pixels of each display device; and the processor is further configured to execute the program to construct the split-screen guiding region including the guiding representation regions according to respective numbers of horizontal pixels and vertical pixels of the plurality of display devices and a mapping relationship between the pixels and the guiding regions.

* * * * *